US009545971B2

(12) United States Patent
Beutner

(10) Patent No.: US 9,545,971 B2
(45) Date of Patent: Jan. 17, 2017

(54) BICYCLE FRAME MADE OUT OF FIBER-REINFORCED MATERIAL COMPRISING AN ADAPTER PLATE FOR THE REAR WHEEL

(71) Applicant: Winora-Staiger GmbH, Sennfeld/Schweinfurt (DE)

(72) Inventor: Ingo Beutner, Gemuenden (DE)

(73) Assignee: WINORA-STAIGER GMBH, Sennfeld (DE)

( * ) Notice: Subject to any disclaimer, the term of this patent is extended or adjusted under 35 U.S.C. 154(b) by 0 days.

(21) Appl. No.: 14/470,486

(22) Filed: Aug. 27, 2014

(65) Prior Publication Data

US 2015/0061257 A1     Mar. 5, 2015

(30) Foreign Application Priority Data

Aug. 28, 2013    (DE) .................. 10 2013 014 336

(51) Int. Cl.
| | |
|---|---|
| B62K 25/02 | (2006.01) |
| B62K 19/16 | (2006.01) |
| B62K 19/28 | (2006.01) |
| B62K 3/02 | (2006.01) |
| B62M 9/127 | (2010.01) |

(52) U.S. Cl.
CPC .............. *B62K 25/02* (2013.01); *B62K 3/02* (2013.01); *B62K 19/16* (2013.01); *B62M 9/127* (2013.01)

(58) Field of Classification Search
CPC ......... B62K 25/02; B62K 19/16; B62K 19/28; B62K 19/24; B62J 2099/0046
USPC ............................ 280/284, 288, 288.3, 288.2
See application file for complete search history.

(56) References Cited

U.S. PATENT DOCUMENTS

| | | | | | |
|---|---|---|---|---|---|
| 4,524,989 | A | * | 6/1985 | Centeny .................... | 280/281.1 |
| 5,020,819 | A | * | 6/1991 | D'Aluisio et al. ........... | 280/288 |
| 5,076,601 | A | * | 12/1991 | Duplessis ................. | 280/281.1 |
| 5,082,303 | A | * | 1/1992 | Duehring et al. ........... | 280/288 |
| 5,096,215 | A | * | 3/1992 | Chonan ......................... | 280/284 |
| 8,087,686 | B1 | * | 1/2012 | Carroll et al. ................ | 280/288 |
| 8,899,606 | B2 | * | 12/2014 | Cocalis ..................... | 280/281.1 |
| 2006/0232041 | A1 | | 10/2006 | Chen | |
| 2011/0042917 | A1 | * | 2/2011 | Cleveland .................... | 280/288 |

(Continued)

FOREIGN PATENT DOCUMENTS

| | | |
|---|---|---|
| DE | 29719082 | 12/1997 |
| DE | 20213160 | 1/2003 |

(Continued)

OTHER PUBLICATIONS

European Search Report dated Jan. 20, 2015 for counterpart European Application No. 14 00 2968.

(Continued)

*Primary Examiner* — Anne Marie Boehler
(74) *Attorney, Agent, or Firm* — Shuttleworth & Ingersoll, PLC; Timothy J. Klima

(57) ABSTRACT

The invention relates to a bicycle frame made of fiber-reinforced material, particularly of plastic reinforced with carbon fibers, having a rear wheel suspension for supporting the rear wheel. According to the invention, a receptacle is formed on at least one of the two chain stays of the rear wheel suspension, in which a replaceable adapter plate adapted to the hub of each rear wheel to be used is removably fastened, in which the axle of the rear wheel can be supported.

7 Claims, 5 Drawing Sheets

(56) References Cited

U.S. PATENT DOCUMENTS

Figure 2:
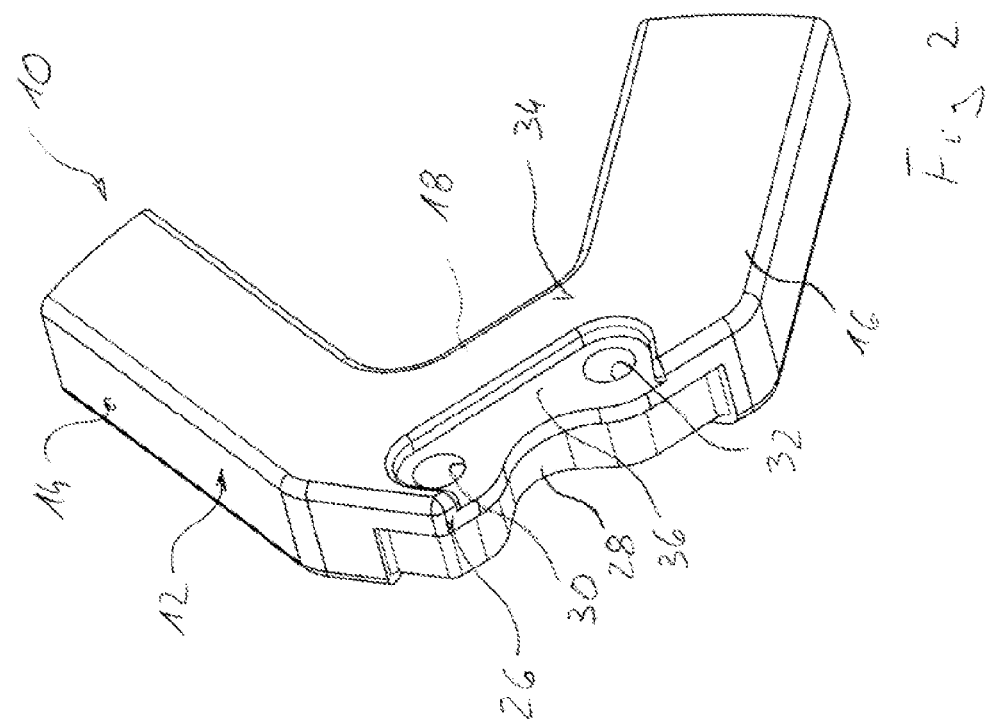

2011/0316251 A1   12/2011   Lumpkin
2012/0235379 A1    9/2012   Trimble et al.
2012/0274042 A1*  11/2012   Harris et al. .................. 280/288

FOREIGN PATENT DOCUMENTS

| DE | 10200568     |   | 7/2003  |
|----|--------------|---|---------|
| DE | 202007008886 |   | 11/2007 |
| DE | 202009004819 |   | 10/2010 |
| EP | 0244885      |   | 11/1987 |
| EP | 1479602      |   | 11/2004 |
| EP | 1671878      |   | 6/2006  |
| EP | 2557029 A1   |   | 2/2013  |
| EP | 2716534      | * | 4/2014  |
| WO | 9524332      |   | 9/1995  |

OTHER PUBLICATIONS

German Examinaton Report dated Mar. 17, 2016 for counterpart German application No. DE 10 2013 014 336.5.
banggood.com Webpage featuring MTB Bicycle Frame Rear Derailleur Mech Hanger Dropout With Nuts—Date unknown but prior to U.S. filing date.

* cited by examiner

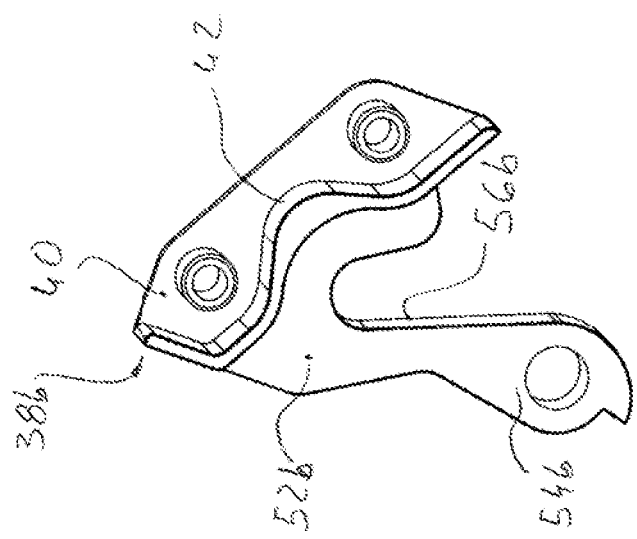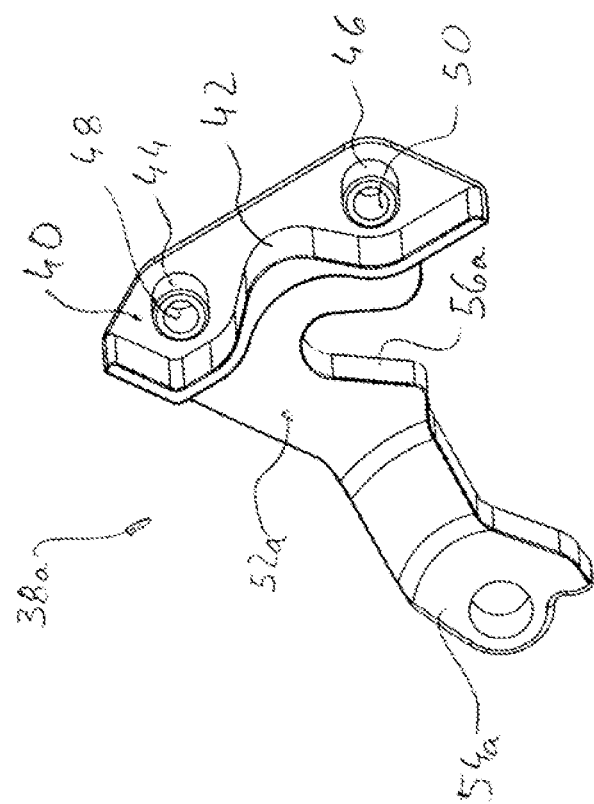

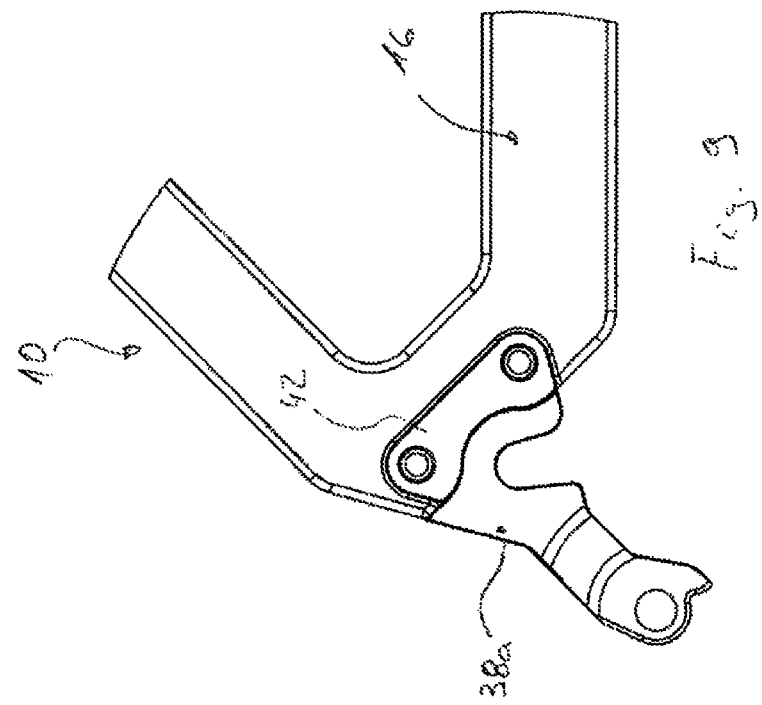
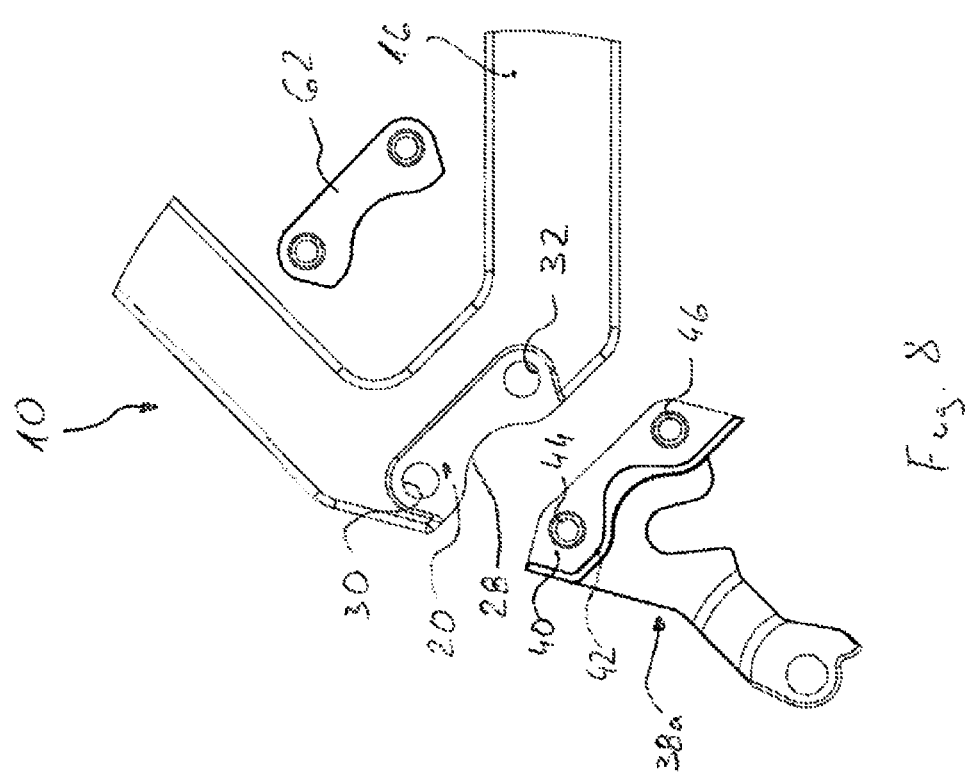

BICYCLE FRAME MADE OUT OF FIBER-REINFORCED MATERIAL COMPRISING AN ADAPTER PLATE FOR THE REAR WHEEL

This application claims priority to German Patent Application DE102013014336.5 filed Aug. 28, 2013, the entirety of which is incorporated by reference herein.

The invention relates to a bicycle frame made of fiber-reinforced material, particularly of plastic reinforced with carbon fibers, having a rear wheel suspension for supporting the rear wheel.

For some time more and more bicycle frames have been made of fiber-reinforced materials. Carbon-fiber reinforced plastics (CFRP) have been found to be particularly well suited for manufacturing bicycle frames, because said materials are characterized by high strength and rigidity at low weight.

A disadvantage of bicycle frames made of fiber-reinforced materials, such as carbon-fiber reinforced plastics, is the difficulty of manufacturing the bicycle frames. Bicycle frames made of carbon-reinforced plastics must be manufactured from fiber mats and liquid plastic components in a plurality of steps and cured in molds by heat-treating at high temperatures.

Due to the complex manufacturing process, the number of variants of bicycle frame shapes is generally kept small.

This has the result, however, that installation of rear wheel hubs having different designs and shapes is made more difficult. In order to allow different hubs to be installed, therefore, more fastening opening, protrusions, and the like are formed on the rear wheel suspension for bicycle frames made of fiber-reinforced materials, in order to handle the potential installation of different rear wheel hubs.

The object of the present invention is therefore to provide a bicycle frame made of fiber-reinforced material, wherein the rear wheel suspension can be adapted in a simple manner to different rear wheel hubs.

For a bicycle frame of the type indicated above, the object is achieved according to the invention in that a receptacle is formed on at least one of the two chain stays of the rear wheel suspension, in which a replaceable adapter plate adapted to the hub of each rear wheel to be used is removably fastened, in which the axle of the rear wheel can be supported.

For the bicycle frame according to the invention, a receptacle of defined shape is formed on at least one of the chain stays of the rear wheel suspension, preferably implemented identically on all bicycle frames to be manufactured, The different shapes of rear wheel hubs are considered by the adapter plates according to the invention. Depending on which rear wheel hub is to be installed, different adapter plates are used. In this context it is emphasized that the adapter plates can also be configured and designed such that corresponding fastening locations are provided for the shifting mechanism to be used for the rear wheel hub to be installed in each case.

Because no consideration is required for the different hub shapes of the rear wheel for the rear wheel suspension on the bicycle frame according to the invention, the receptacle for the adapter plate can be optimized with respect to the installation of the adapter plate and additional fastening openings and fastening protrusions, such as for shifting mechanisms, brake levers, etc., that could degrade the strength and rigidity particularly in the region of the bearing of the rear wheel hub are not needed.

Further advantages of the invention are found in the following description, the subclaims, and the drawings.

For a particularly preferred refinement of the bicycle frame according to the invention, a receptacle is formed on the chain stay of the rear wheel suspension in which the adapter plates are to be inserted and fastened, wherein one of the adapter plates, if needed, additionally has fastening locations for the shifting mechanism.

In order to ensure secure retention of the adapter plate on the bicycle frame, the adapter plate is secured to the bicycle frame not only in a force-fit manner by means of corresponding mechanical pre-tensioning by means of fastening elements, but also in a form-fit manner by corresponding provision of protrusions, pegs, contact surfaces, and the like implemented both in the receptacle and on the adapter plate in a complementary manner.

The receptacle in a particularly preferred embodiment of the bicycle frame according to the invention thus comprises at least two contact surfaces on which the adapter plate makes contact in the assembled state with complementary support surfaces implemented therein. The support surfaces can run at an angle to each other to this end, in order to thus ensure support in different load directions. Furthermore, the greater the support surfaces, the forces acting on the adapter plate across the support surfaces are uniformly distributed across the support surfaces, so that the resulting forces are transferred to the bicycle frame across a large area and the fastening elements are simultaneously relieved. The support surfaces thereby preferably run in planes running substantially parallel to the axis of rotation of the hub.

Said effect is further intensified if the adapter plate has edge-shaped protrusions protruding normal to the adapter plate and thus the surface areas at which the adapter plate actually is supported on the support surfaces are additionally enlarged and thereby the resulting surface pressure is reduced.

In a particularly preferred embodiment of the bicycle frame according to the invention, an opening connected to the hollow chain stay is provided on the receptacle and is covered by the installed adapter plate. Said opening can, if needed, be used as an exit opening for cables, lines, or pulls. If cables, lines, or pulls are routed through the opening, such as in order to actuate the shifting mechanism of the rear wheel hub, then a pass-through opening connected to the opening in the chain stay is provided in the adapter plate for passing through the cables, lines, or pulls. If it makes sense, such as for Bowden pulls, the end face of the jacket of the Bowden pull can be supported on the adapter plate. while the Bowden pull runs through the pass-through opening.

In order to make the installation of the adapter plate easier, and to prevent the installation of unsuitable adapter plates, it is further proposed that at least one alignment opening is provided on the receptacle and engages with a peg provided at a suitable location on the adapter plate when the adapter plate is installed. It is hereby further advantageous if the alignment opening formed on the receptacle is implemented as a pass-through opening, while a pass-through hole for a fastening element extends through the peg, said element protruding through the pass-through opening of the receptacle. The alignment opening and the peg thereby simultaneously also fulfill a function as a fastening location.

By correspondingly combining the previously described support surfaces and the alignment opening on the receptacle, and the edge-shaped protrusions and pegs on the adapter plate, it can be very effectively ensured that only suitable adapter plates can be installed on each bicycle frame.

In order to further increase the strength and rigidity of the bicycle frame in the region of the support of the rear wheel hub, such as for bicycle frames subjected to high and primarily impactful loads, such as mountain bikes, it is further proposed that a recess for receiving a counter plate is provided on the rear side of the chain stay facing away from the receptacle, wherein the counter plate serves as a thrust block for fastening elements extending through the pass-through openings provided on the chain stay and releasably connected the adapter plate and the counter plate to each other. The recess, like the receptacle, can also have corresponding support surface at which the counter plate can make contact in order to form a form-fit connection.

Figure 1:
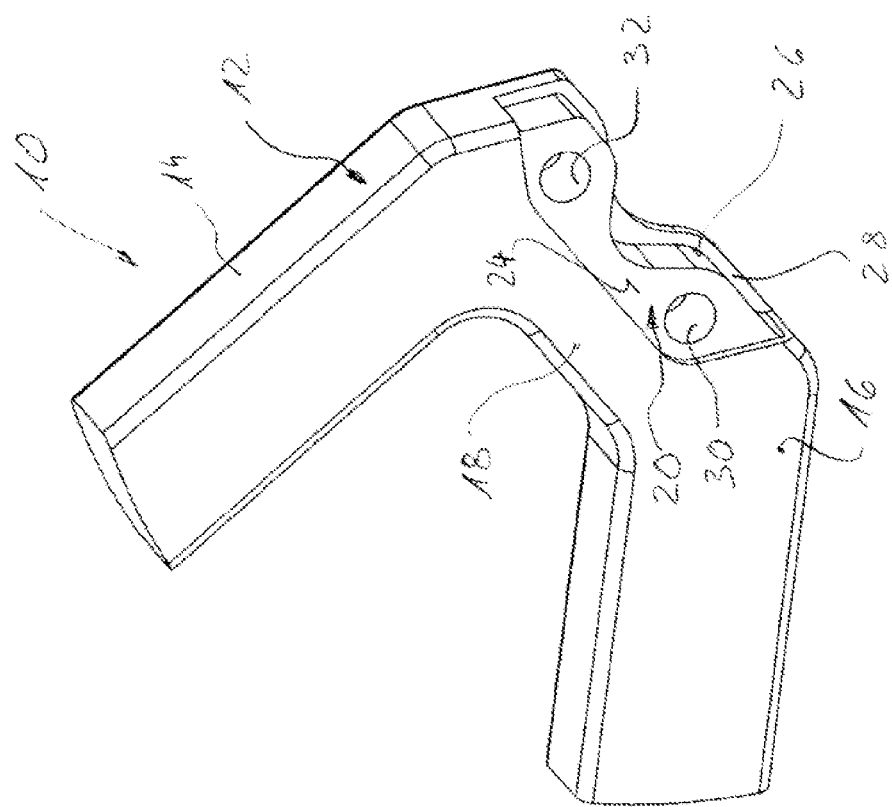
Figure 7:
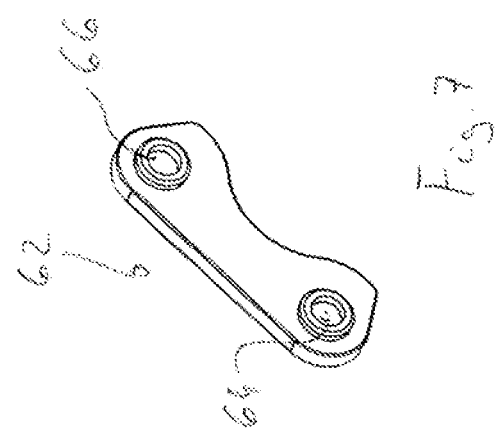
Figure 6:
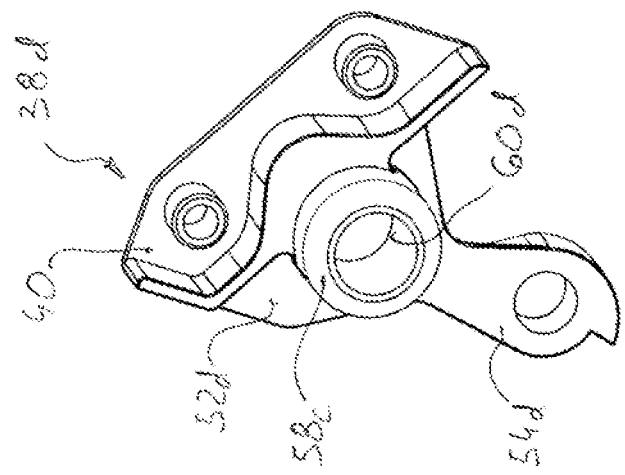
Figure 5:
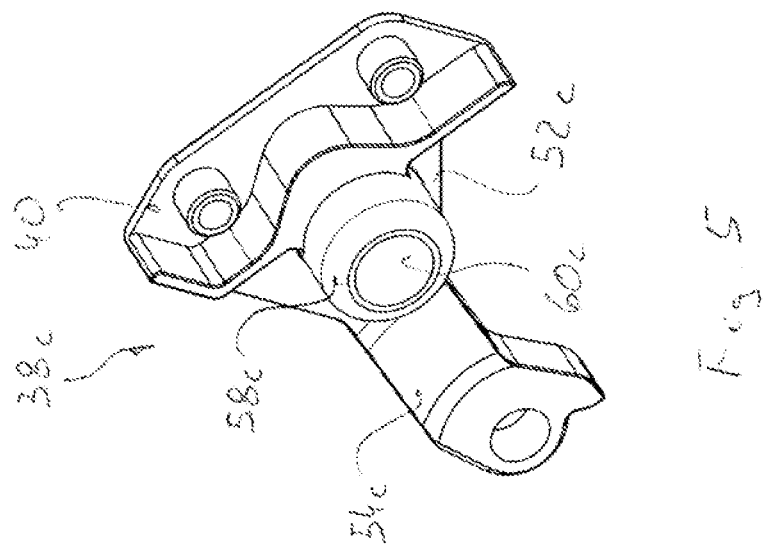
Figure 11:
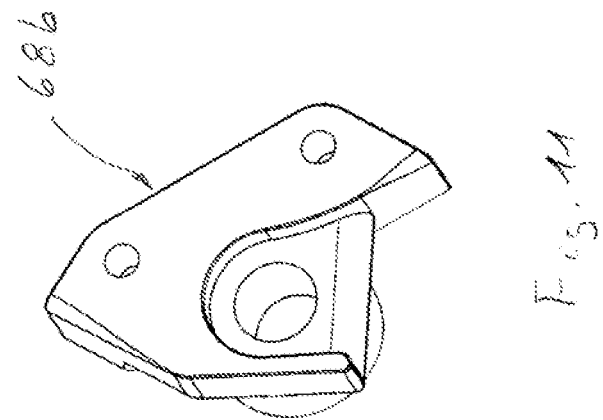
Figure 10:
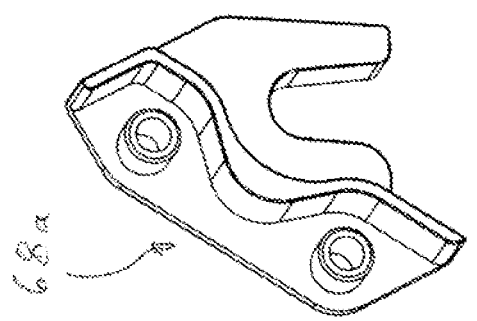

The invention is, described in more detail below, using an embodiment example and referencing the figures. Shown are:

FIG. 1 A perspective view of a segment of a rear wheel suspension disposed on the right of a bicycle frame according to the invention, as viewed from the inside, FIG. 2 A perspective view of the segment of the rear wheel suspension disposed on the right, as viewed from the outside, FIG. 3 A perspective view of a first variant of an adapter plate for an axle having a quick-release and a retaining segment for the shifting mechanism to be fastened to the rear wheel suspension disposed on the right, FIG. 4 A perspective view of a second variant of an adapter plate for an axle having a quick-release and a retaining segment for the shifting mechanism to be fastened to the rear wheel suspension disposed on the right, FIG. 5 A perspective view of a third variant of an adapter plate for an insertion axle having a retaining segment for an alternative shifting mechanism to be fastened to the rear wheel suspension disposed on the right, FIG. 6 A perspective view of a fourth variant of an adapter plate for an insertion axle having a retaining segment for the alternative shifting mechanism to be fastened to the rear wheel suspension disposed on the right, FIG. 7 A perspective view of a counter plate, FIG. 8 An external view of the segment from FIG. 1 immediately prior to installation of the first version of an adapter place shown in FIG. 3, together with a counter plate, FIG. 9 An external view of the segment from FIG. 8 immediately after installation, FIG. 10 A perspective view of a first variant of an adapter plate for an axle having a quick-release to be fastened to the rear wheel suspension disposed on the left, FIG. 11 A perspective view of a second variant of an adapter plate for an insertion axle to be fastened to the rear wheel suspension disposed on the left, FIG. 1 shows a perspective view of a segment of a rear wheel suspension 12 disposed on the right of a bicycle frame 10 according to the invention, as viewed from the inside.

The bicycle frame 10 is substantially made of a carbon-fiber reinforced plastic. FIG. 1 shows the transition from the seat stay 14 to the chain stay 16. The transition 18 is thereby defined as an angled segment of the chain stay 16 transitioning into the seat stay 14.

As can be further seen in FIG. 1, the transition 18 comprises a receptacle 20 implemented in the form of a pocket 24 on the flat side 22 facing inward, while the surface segment 26 facing rearward and running at a right angle to the flat side 22 facing inward comprises a bow-shaped recess 28. The pocket 24 and the bow-shaped recess 28 together form the receptacle 20.

Two pass-through openings 30 and 32 disposed adjacent to each other are further provided in the receptacle 20 and are implemented on both sides of the bow-shaped recess 28 in the pocket and extend through the transition 18 toward the outer side 34.

FIG. 2 shows a perspective view of the segment of the rear wheel suspension disposed on the right and shown in FIG. 1, but as seen from the outside. As can be seen in FIG. 2, a substantially perpendicular recess 36 rounded at each end is formed at the outer side 34 and bounds against the surface segment 24 facing inward.

FIG. 3 through 6 show four different variants of an adapter plate 38a to 38d that can be fastened at the receptacle for different hub types or shifting mechanisms. The adapter plates 38a through 38d are made of steel, particularly of a high-strength steel, or a comparably strong material.

Each adapter plate 38a through 38d has a fastening segment 40 implemented identically for all adapter plates 38a through 38d and by means of which the adapter plates 38a through 38d are to be fastened at the receptacle 20. Therefore the construction of the fastening segment 40 will be explained in more detail below with reference to FIG. 3 and to the adapter plate 38a shown therein as a representative of the other adapter plates 38b through 38d.

The fastening segment 40 is flattened on the side thereof later facing the receptacle 20 in the pocket 24 and is bounded by a bow-shaped protrusion 42. The inner surface of the bow-shaped protrusion 42 is thereby formed complementary to the curve of the bow-shaped recess 28 of the receptacle 20. Two pegs 44 and 46 are formed in the interior of the fastening segment 40 and are disposed with respect to the bow-shaped protrusion 42 such that when the adapter plate 38a is placed in the receptacle 20, the two pegs 44 and 46 engage with the two pass-through openings 30 and 32. One pass-through threaded hole 48 and 50 passes through each of the pegs 44 and 46. The actual hub fastening 52 and a retaining segment 54 formed thereon for a shifting mechanism to be installed is adjacent to the fastening segment 40.

For the first variant shown in FIG. 3, the hub fastening 52a comprises an open elongated hole 56a in which a hub having a quick-release can be placed. The disposed retaining segment 54a is offset twice and serves for fastening a first type of shift mechanism.

The second variant shown in FIG. 4 corresponds substantially to the first variant shown in FIG. 3, but with the difference that the retaining segment 54b for the shifting mechanism is not offset but flat in design, in order to allow a second type of shifting mechanism to be fastened.

For the third and fourth variants shown in FIGS. 5 and 6, the retaining segments 54c and 54d each correspond to the offset and flat retaining segments 54a and 54d of the variants shown in FIGS. 3 and 4. The substantial difference between the third and fourth variants and the first two variants is in the hub fastening 52c and 52d. Here instead of an open elongated hole, one peg 58c and 58d is provided in which a bearing 60c and 60d is implemented for an insertion axle of a hub.

FIG. 7 shows a perspective view of a counter plate 62. The counter plate 62 is also made of a metal material. The outer contour of the counter plate 62 corresponds to the inner contour of the recess 36 formed on the outer side 34 of the transition 18. Two countersunk holes 64 and 66 are also provided on the counter plate 62 and are flush with the pass-through openings 30 and 32 when the counter plate 62 is inserted in the recess 36.

FIGS. 8 and 9 show the installation of the adapter plate 38a shown in FIG. 3 and the counter plate 62 at the transition 18.

The fastening segment 40a of the adapter plate 38a is inserted in the receptacle 20, wherein the pegs 44 and 46 are inserted into the pass-through holes 30 and 32. The bow-shaped protrusion 42 thereby engages with the bow-shaped recess 28 and together with the pegs 44 and 46 forms a form-fit connection between the adapter plate 38a and the transition 18. The counter plate 62 is then placed in the recess 36 and the adapter plate 38a is screwed in place by means of screws (not shown) passing through the holes 64 and 66 of the counter plate 62, and is thus secured by means of a force-fit connection to the transition 18.

FIGS. 10 and 11 show perspective views of a first and a second variant of an adapter plate 68a and 68b to be fastened at the left rear wheel suspension (not shown) of the bicycle frame 10 according to the invention. The left rear wheel suspension in the present case is implemented as a mirror image of the right rear wheel suspension 12.

The adapter plates 68a and 68b substantially correspond to the adapter plates 38a and 38c shown in FIGS. 3 and 5, but with the difference that they are mirror images and the retaining segment 54a and 54c is missing in each case. The adapter plates 68a and 68b are correspondingly fastened to the left rear wheel suspension, as has been described with reference to FIGS. 8 and 9.

The adapter plates 38a through 38d and 69a through 68d can also have pass-through openings in the bow-shaped protrusions 42 thereof, through which cables, lines, or pulls can be run, for example for the shifting mechanism, being routed through an opening provided on the chain stay 16, wherein the opening can be closed off by the adapter plate 38a, 38b, 38c, or 38d.

LIST OF REFERENCE NUMERALS

10 Bicycle frame
12 Rear wheel suspension
14 Seat stay
16 Chain stay
18 Transition
20 Receptacle
22 Flat side facing inward
24 Pocket
26 Flat segment facing rearward
28 Bow-shaped recess
30 Pass-through opening
32 Pass-through opening
34 Outer side
36 Recess
38a through d Adapter plates
40 Fastening segment
42 Bow-shaped protrusion
44 Peg
46 Peg
48 Pass-through threaded hole
50 Pass-through threaded hole
52a through d Hub fastening
54a through d Retaining segment for he shifting mechanism
56a, b Elongated hole
58c, d Peg
60c, d Bearing
62 Counter plate
64 Hole
66 Hole
68a, b Adapter plates

The invention claimed is:

1. A bicycle frame made of fiber-reinforced material, comprising:
   a rear wheel suspension for supporting a rear wheel, wherein the rear wheel suspension includes two chain stays made of fiber-reinforced material and a receptacle integrally formed in the fiber-reinforced material on at least one of the two chain stays;
   a replaceable adapter plate adapted to a hub of each rear wheel to be used, in which an axle of the rear wheel is to be supported, with the adapter plate being removably fastened in the receptacle such that the adapter plate is connected to the bicycle frame non-postively;
   wherein the receptacle comprises at least two support surfaces and wherein the adapter plate includes edged protrusions complementary to the at least two support surfaces of the receptacle, said edged protrusions making contact with the two support surfaces in the assembled state;
   wherein the receptacle includes at least two alignment pass-through openings, and the adapter plate includes at least two pegs which engage with the alignment opening, each of said at least two pegs including a threaded pass-throuqh hole extending though the peg for engaging a fastening element through the pass-through opening of the receptacle; and
   wherein a back side of the chain stay facing away from the receptacle includes a recess for receiving a mating plate, and the mating plate serves as a thrust block for fastening elements being engaged with the threaded pegs extending through said pass-through openings provided in the chain stay and removably connecting the adapter plate to the mating plate.

2. The bicycle frame according to claim 1, and further comprising two receptacles and two replaceable adapter plates, with each chain stay including one of the receptacles, with one of the replaceable adapter plates removably fastened to each receptacle.

3. The bicycle frame according to claim 1, wherein the receptacle includes an opening connected to the at least one of the two chain stays, and that the installed adapter plate covers the opening.

4. The bicycle frame according to claim 1, wherein the fiber-reinforced material is a plastic reinforced by carbon fibers.

5. The bicycle frame according to claim 1, wherein the rear wheel suspension includes an upper stay made of fiber-reinforced material and a transition area made of fiber-reinforced material, with the transition area connecting one of the chain stays to the upper stay; wherein the receptacle is formed in the transition area.

6. The bicycle frame according to claim 5, and further comprising two receptacles and two replaceable adapter plates, with each transition area including one of the receptacles, with one of the replaceable adapter plates removably fastened to each receptacle.

7. The bicycle frame according to claim 1, wherein the rear wheel suspension includes two upper stays made of fiber-reinforced material and two transition areas made of fiber-reinforced material, with each transition area connecting one of the chain stays to one of the upper stays; wherein the receptacle is formed in one of the transition areas.

* * * * *